(12) United States Patent
Brule et al.

(10) Patent No.: US 11,008,492 B2
(45) Date of Patent: May 18, 2021

(54) USE OF A POLYMERIC MATERIAL BASED ON POLYETHERKETONEKETONES FOR REDUCING WEAR

(71) Applicant: Arkema France, Colombes (FR)

(72) Inventors: Benoît Brule, Beaumont-le-Roger (FR); Holger Vandrich, Seevetal (DE)

(73) Assignee: ARKEMA FRANCE, Colombes (FR)

( * ) Notice: Subject to any disclaimer, the term of this patent is extended or adjusted under 35 U.S.C. 154(b) by 12 days.

(21) Appl. No.: 16/468,931

(22) PCT Filed: Dec. 22, 2017

(86) PCT No.: PCT/EP2017/084493
§ 371 (c)(1),
(2) Date: Jun. 12, 2019

(87) PCT Pub. No.: WO2018/115490
PCT Pub. Date: Jun. 28, 2018

(65) Prior Publication Data
US 2020/0079984 A1    Mar. 12, 2020

(30) Foreign Application Priority Data
Dec. 22, 2016  (EP) .................................... 16206488

(51) Int. Cl.
*C08K 3/04*     (2006.01)
*C08K 7/06*     (2006.01)
(Continued)

(52) U.S. Cl.
CPC .......... *C09K 3/149* (2013.01); *C08G 65/4012* (2013.01); *C08K 3/04* (2013.01);
(Continued)

(58) Field of Classification Search
None
See application file for complete search history.

(56) References Cited

U.S. PATENT DOCUMENTS

| 4,965,310 A | 10/1990 | Harris et al. |
| 6,153,303 A * | 11/2000 | Namura ................. C08L 27/18 |
| | | 427/385.5 |

(Continued)

FOREIGN PATENT DOCUMENTS

| CN | 102301046 A | 12/2011 |
| CN | 101842855 A | 9/2020 |

(Continued)

OTHER PUBLICATIONS

International Search Report (PCT/ISA/210) dated Jan. 29, 2018, by the European Patent Office as the International Searching Authority for International Application No. PCT/EP2017/084493.

(Continued)

*Primary Examiner* — Peter A Salamon
(74) *Attorney, Agent, or Firm* — Buchanan Ingersoll & Rooney P.C.

(57) ABSTRACT

A wear and friction article, including on at least one of the surfaces thereof a polymeric material comprising: 20 to 100% by weight of at least one polyetherketoneketone (PEKK); 0 to 80% by weight of one or more fillers; and 0 to 20% by weight of one or more additives. Also, the use of such a polymeric material for reducing wear and/or friction at elevated temperature.

15 Claims, 1 Drawing Sheet

(51) Int. Cl.
*C09K 3/14* (2006.01)
*C08G 65/40* (2006.01)
*C08L 71/00* (2006.01)

(52) U.S. Cl.
CPC ............... *C08K 7/06* (2013.01); *C08L 71/00* (2013.01); *C08G 2650/40* (2013.01)

(56) References Cited

U.S. PATENT DOCUMENTS

| | | | |
|---|---|---|---|
| 6,228,932 B1* | 5/2001 | Saito | C08K 3/22 523/220 |
| 6,265,492 B1 | 7/2001 | Lahijani | |
| 2006/0110601 A1* | 5/2006 | Hennessey | B05D 7/542 428/422 |
| 2008/0187667 A1* | 8/2008 | Hennessey | B05D 7/14 427/299 |
| 2009/0092827 A1* | 4/2009 | Robinson | C08L 2666/04 428/341 |
| 2009/0117356 A1 | 5/2009 | Hsu et al. | |
| 2010/0144955 A1 | 6/2010 | El-hibri et al. | |
| 2011/0287255 A1 | 11/2011 | Bertelo et al. | |
| 2015/0079378 A1 | 3/2015 | Garcia-leiner et al. | |
| 2016/0304716 A1* | 10/2016 | Gopalakrishnan | C08L 79/08 |
| 2020/0079984 A1* | 3/2020 | Brule | C08G 65/4012 |

FOREIGN PATENT DOCUMENTS

| | | |
|---|---|---|
| EP | 2892957 A1 | 7/2015 |
| EP | 2899232 A1 | 7/2015 |
| JP | 2001-049068 A | 2/2001 |
| JP | 2001-055478 A | 2/2001 |
| JP | 2006-511644 A | 4/2006 |
| WO | 0210320 A1 | 2/2002 |
| WO | 2004/058866 A1 | 7/2004 |
| WO | 2007132153 A1 | 11/2007 |
| WO | 2008050083 A1 | 5/2008 |
| WO | 2010107976 A1 | 9/2010 |
| WO | 2014037375 A1 | 3/2014 |
| WO | 2015059216 A1 | 4/2015 |

OTHER PUBLICATIONS

Written Opinion (PCT/ISA/237) dated Jan. 29, 2018, by the European Patent Office as the International Searching Authority for International Application No. PCT/EP2017/084493.

Office Action (The First Office Action) dated Oct. 30, 2020, by the China National Intellectual Property Administration, in corresponding Chinese Patent Application No. 201780079191.7, English Translation only. (9 pages).

Office Action (Notice of Reasons for Rejection) dated Jan. 25, 2021, by the Japanese Patent Office in corresponding Japanese Patent Application No. 2019-533371, and an English Translation of the Office Action. (6 pages).

* cited by examiner

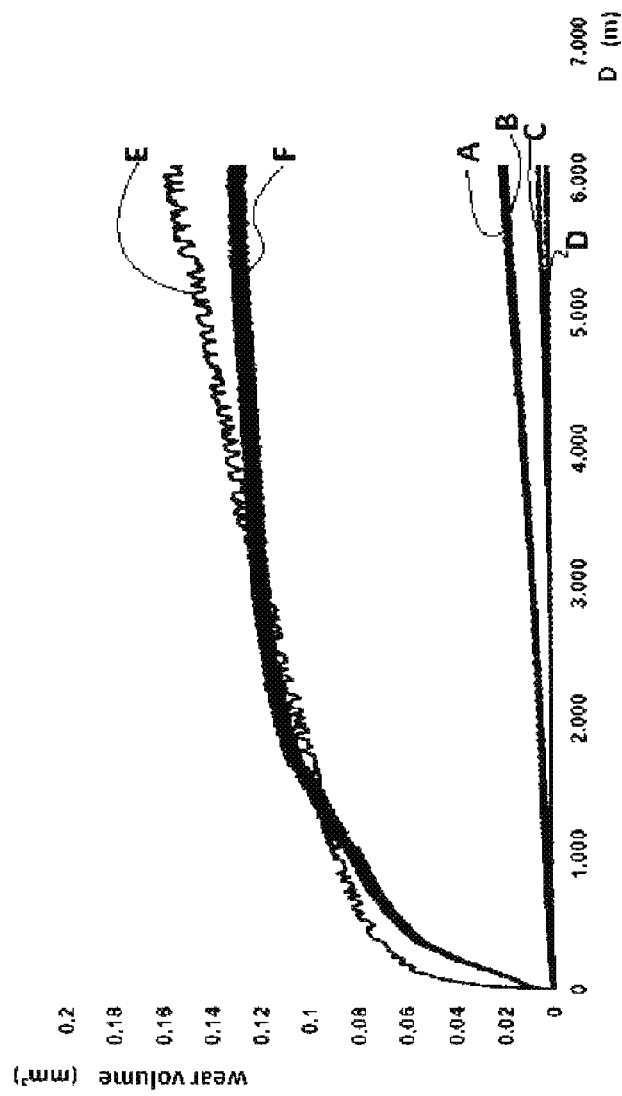

USE OF A POLYMERIC MATERIAL BASED ON POLYETHERKETONEKETONES FOR REDUCING WEAR

TECHNICAL FIELD

The present application concerns wear and friction articles comprising a polymeric material based on polyetherketoneketone (PEKK) polymers.

It further concerns the use of a polymeric material comprising polyetherketoneketone for reducing the wear at elevated temperature.

BACKGROUND ART

Wear is a major cause of failure and limited service life of manufactured parts that contact another surface while they are in motion.

Wear is related to interactions between surfaces and specifically the removal and/or deformation of material on a surface as a result of mechanical action of the opposite surface.

The consequences of wear can become perceptible in different forms, for example as a loss of mass, of dimensional stability, of shape, or as a change in structure. Wear alters the dimensions of parts, increases the clearance and affects the properties of the surface. Generally, wear of polymers increases with temperature as the material softens.

Wear may lead to performance degradation and/or damage to components, and is responsible for much of the ageing of manufactured parts. In many industrial applications, components become worn and must be replaced. These replacements may be costly due to expensive components, labor and the down time of the equipment during the replacement.

Friction is one of the main causes of wear. Friction is the force resisting the relative motion of solid surfaces, fluid layers, and material elements sliding against each other. When surfaces in contact move relative to each other, the friction between the two surfaces converts kinetic energy into thermal energy. Friction between surfaces may arise from a combination of inter-surface adhesion, surface roughness, surface deformation, and surface contamination.

There is a large diversity in the materials that may be used for reducing wear. Such materials may comprise polymers. For example, fluoropolymers may be used to reduce the coefficient of friction. Fillers may be used to increase the modulus and thereby reduce wear.

Polyaryletherketones are polymers that exhibit a high melting temperature, mostly over 300° C., exceptional thermal resistance and excellent mechanical properties. High performance polymers such as polyetherketoneketones are increasingly used in different applications to replace metals, notably in order to reduce weight.

Vixtrex commercializes a polyetheretherketone (PEEK) polymer grade reinforced with carbone fiber and further containing graphite and fluoropolymers (Victrex 450 FC 30).

While polyaryletherketones have been studied with regard to wear and friction, the literature has focused in particular on some polymers of the family, notably polyetheretherketone (PEEK).

For instance, patent application WO 02/10320 A (TRIMACK) discloses the use of polymers and more specifically of polyetheretherketone (PEEK) with lubricious reinforcing fibers for the manufacture of articles having improved tribological characteristics.

U.S. Pat. No. 4,965,310 B (AMOCO CORPORATION) proposes to improve wear resistance of polyaryletherketones (PAEK) by blending them with polyimides.

Patent application WO 2015/059216 A (SOLVAY SPECIALTY POLYMER) discloses articles with low friction and wear that comprise a blend of polyaryletherketones (PAEK) and polyetherimides (PEI) and reinforcing fibrous and non-fibrous fillers.

Patent application WO 2007/132153 A (VICTREX) proposes low wear coatings wherein a PAEK, notably a polyetheretherketone (PEEK), is blended with a fluorinated polymer.

However, there is still a need for materials that exhibit improved wear characteristics at elevated temperature, and thereby allow for manufactured articles with an extended service life and/or that may be used at higher temperature ranges.

SUMMARY OF INVENTION

It has now been found unexpectedly that the wear behaviour of the different polyaryletherketone (PAEK) polymers differ substantially, and notably that polyetherketoneketone (PEKK) has particularly advantageous wear properties, both in terms of absolute value and stability over temperature.

In particular, it has been observed that the specific wear rate of polyetherketoneketone (PEKK) increases to some extent with temperature including when approaching the glass transition and beyond, while a similar polyaryletherketone such as polyetheretherketone (PEEK) displays large and sudden variations. In parallel, the wear rate of PEKK in the temperature range between 85 and 175° C. is lower than the one of PEEK.

The observed wear properties appear to be fairly independent from the friction properties.

Even when formulated with fillers, the difference in the wear behaviour between the different PAEK polymers remained. Accordingly, PEKK formulations show a clear advantage in terms of wear with respect to equivalent formulations of PEEK.

It is essential for wear and friction articles that wear is as low as possible, and remains so even when temperature increases. Indeed, temperature may rise not only in the environment during the article's use—heat is also produced by friction. Accordingly, even when used at room temperature, the temperature of the article may rise locally upon increasing load and/or speed.

Accordingly, a first object of the present invention is a wear and friction article comprising on at least one of the surfaces thereof a polymeric material comprising: 20 to 100% by weight of at least one polyetherketoneketone (PEKK); 0 to 80% by weight of one or more fillers; and 0 to 20% by weight of one or more additives.

Preferred wear and friction articles according to the invention are manufactured parts that upon use are in contact with other surfaces while being in motion. Particularly preferred such articles may be selected in the group consisting of bearings, bushings, valve seats, gears, pistons, piston rings, valve guides, compressor vanes, seals and components of engines.

Particularly preferred is a polyetherketoneketone with a T:I isomer ratio of from 50:50 to 100:0, and in particular of from 55:45 to 100:0 and especially from 55:45 to 85:15.

Depending on the requirements of the application, it may be useful that the polymeric material comprises one or more fillers.

Fillers may be in particular mineral fillers, such as metal oxides or carbon based fillers, and/or polymeric fillers. Preferred mineral fillers include graphite, carbon black, carbon fibers, carbon nanotubes, glass beads, flakes and fibers, metal oxides such as silica, titanium dioxide, aluminium oxides, or other inorganic materials such as talc, calcium carbonate, as well as mixtures thereof. Preferred polymeric fillers include polytetrafluoroethylene (PTFE), ethylenefluoroethylene (ETFE), perfluoroalkoxyalkanes (PFA), fluorinated ethylene propylene (FEP), aramides, notably aramide fibers, siloxanes and mixtures thereof.

Appropriate fillers may furthermore have different morphology. In particular, they may be in particular fibrous or non-fibrous.

According to a second aspect, the invention concerns the use of a polymeric material comprising: 20 to 100% by weight of at least one polyetherketoneketone (PEKK); 0 to 80% by weight of one or more fillers; and 0 to 20% by weight of one or more additives for reducing wear at elevated temperature.

According to a preferred embodiment of the invention, the specific wear rate of the PEKK matrix as measured according to ASTM G137 using the block-on-ring configuration (loading: 5 MPa; sliding speed (unidirectional, dry): 1 m/s; counterbody: 100Cr6) does not exceed $30 \cdot 10^{-6}$ mm$^3$/Nm at temperatures up to 10° C. above the glass transition temperature (Tg), preferably less than $25 \cdot 10^{-6}$ mm$^3$/Nm and in particular less than $20 \cdot 10^{-6}$ mm$^3$/Nm. In contrast, the specific wear rate of PEEK exceeds $30 \cdot 10^{-6}$ mm$^3$/Nm already at a temperature of 130° C., that is, 20° C. below the glass transition temperature. Furthermore, the wear rate of PEEK becomes increasingly inhomogeneous when approaching the Tg, as apparent from the high standard deviation.

BRIEF DESCRIPTION OF DRAWINGS

The foregoing and other objects and advantages of the embodiments described herein will become apparent with reference to the following detailed description when taken in conjunction with the accompanying drawing in which:

FIG. 1 is a graph of the wear volume of reinforced PEKK and PEEK formulations A-F as set out in table 3 below as a function of the sliding distance, as measured according to example 5.

DESCRIPTION OF EMBODIMENTS

As used herein, the term "article" may be used interchangeably with the term "part", "manufactured part" or "object".

In the present application, the expression "bearing" refers to any article having a surface that interacts with a surface in relative motion, for example, by sliding, pivoting, oscillating, reciprocating, rotating, or the like. Examples of such articles include, sleeve bearings, journal bearings, thrust washers, rub strips, bearing pads, ball bearings, including the balls, valve seats, piston rings, valve guides, compressor banes and seals, both stationary and dynamic.

As used herein, the term "filler" refers to a particulate component that may be present in a polymeric material so as to improve its properties while remaining substantially inert. Generally, fillers are homogeneously dispersed and present in substantial amounts, that is, generally more than 10% by weight, and most often more than 20% by weight of the polymeric material.

As used herein, the term "additive" refers to a component that may be present in a polymeric material so as to improve its properties or confer further specific properties. Generally, additives are present in minor amounts, that is, generally less than 20% by weight, and most often less than 10% by weight of the polymeric material.

As used herein, the expression "polymeric material" refers to a homogeneous composition comprising one or more polymers, preferably only PEKK, and optionally other compounds, notably fillers and/or additives.

As used herein, the expression "wear" refers to a specific wear rate as measured according to ASTM G137 using the block-on-ring configuration with a loading of 5 MPa, a sliding speed (unidirectional, dry) of 1 m/s and a counterbody made of 100Cr6. Preferably, the specific wear rate of the neat PEKK resin (without fillers) does not exceed $30 \cdot 10^{-6}$ mm$^3$/Nm, preferably $20 \cdot 10^{-6}$ mm$^3$/Nm, at a temperature of up to 175° C.

Accordingly, the expression "friction" refers to a friction coefficient as measured according to the standard ASTM G137 above, in the same conditions. Preferably, the friction coefficient of the neat PEKK resin (without fillers) does not exceed 0.45 at a temperature of 175° C.

In the present application, the expression "elevated temperature" refers to a temperature above 30° C., preferably above 50° C., more preferably above 80° C. More generally, the expression refers to a range of temperature that includes the glass transition temperature $T_g$ of the polymer, but not its melting temperature since the notion of wear is only defined for a solid. The melting temperatures differ for the PEKK polymers depending on the T:I ratio. As a general rule however, the expression refers to a temperature interval from 30 to 395° C., preferably from 50 to 360° C., in particular from 80 to 330° C., more preferred from 90 to 300° C., notably from 100 to 250° C. and most preferred from 130 to 180° C.

As used herein, each compound may be discussed interchangeably with respect to its chemical formula, chemical name, abbreviation, etc. For example, PEKK may be used interchangeably with poly(etherketoneketone). Additionally, each compound described herein, unless designated otherwise, includes homopolymers and copolymers. The term "copolymers" is meant to include polymers containing two or more different monomers and can include, for example, polymers containing two, three or four different repeating monomer units.

As used herein and in the claims, the terms "comprising" and "including" are inclusive or open-ended and do not exclude additional unrecited elements, compositional components, or method steps. Accordingly, the terms "comprising" and "including" encompass the more restrictive terms "consisting essentially of" and "consisting of".

The present invention is based on the discovery that PEKK polymers show a different wear behaviour compared to similar polyaryletherketones, notably the better known PEEK. In particular, it was observed that the specific wear rate of PEEK varies strongly with temperature, notably close to the glass transition. A high wear rate accelerates the ageing of manufactured parts, which leads to shortened service life and higher costs due to frequent replacement and associated down time.

In contrast, PEKK polymers show a smooth and controlled evolution of the specific wear with temperature even in the region around the glass transition temperature (Tg). PEKK polymers thus exhibit steady wear properties over an extended temperature range when compared to PEEK, in particular when taking into account the offset in the glass transition temperature. Accordingly, PEKK polymers appear to be a material of choice for producing structures such as articles with a bearing surface that are subjected to high load, high speed, and/or elevated temperature.

Polyetherketoneketones suitable for use in the present invention may comprise or essentially consist of repeating units represented by the following formulas I and II:

Where A is a p,p'-Ph-O-Ph group, Ph is a phenylene radical,B is p-phenylene, and D is phenylene. The Formula I:Formula II (T:I) isomer ratio can range from 100:0 to 0:100. The isomer ratio may be easily varied as may be desired to achieve a certain set of properties, e.g. by varying the relative amounts of the different monomers used to prepare the polyetherketoneketone. Generally speaking, a polyetherketoneketone having a relatively high Formula I:Formula II ratio will be more crystalline than a polyetherketoneketone having a lower Formula I:Formula II ratio. This, the T:I ratio may be adjusted so as to provide an amorphous (non-crystalline) polyetherketoneketone or a more crystalline polyetherketoneketone, as desired. In one embodiment, a polyetherketoneketone having a T:I isomer ratio of from 50:50 to about 100:0 may be employed. Particularly preferred is PEKK having a T:I isomer ratio of from 55:45 to 85:15 and in particular 60:40 to 80:20. The T:I isomer ratio can be varied by adjusting the ratio between monomer derived from terephtalic acid and monomer derived from isophtalic acid in the monomer mixture used to produce the polyetherketoneketone. The T:I ratio of a PEKK polymer can be determined using standard analysis techniques such as 1-H NMR spectroscopy.

The wear and friction article according to the invention comprises on at least one of the surfaces thereof a polymeric material comprising: 20 to 100% by weight of at least one polyetherketoneketone (PEKK); 0 to 80% by weight of one or more fillers; and 0 to 20% by weight of one or more additives. According to a preferred embodiment, the polymeric material does not comprise any other ingredients and thus consists of the components mentioned.

While the polymeric material may consist only of PEKK, it may be advantageous to add one or more fillers and/or one or more additives to the polymer to produce a polymeric material with the appropriate properties.

According to a preferred embodiment, the polymeric material thus comprises 30 to 90%, and in particular 40 to 80 and especially 50 to 70% by weight of at least one polyetherketoneketone (PEKK) polymers.

Further preferred is a polymeric material comprising 10 to 70% by weight, in particular 20 to 60, especially 30 to 50% and most preferred 35 to 45% by weight of one or more fillers.

Fillers may be in particular mineral fillers, such as metal oxides or carbon based fillers, and/or polymeric fillers.

Mineral fillers include in particular carbon based materials such as graphite, carbon black, or carbon fibers, glassy materials such as glass beads, flakes and fibers, metal oxides such as silica, titanium dioxide, aluminium oxides, or other inorganic materials such as talc, calcium carbonate, as well as mixtures thereof. Preferred mineral fillers are carbon based fillers, glass based fillers and metal oxides and mixtures thereof.

Polymeric fillers include notably fluoropolymers such as polytetrafluoroethylene (PTFE), ethylenefluoroethylene (ETFE), perfluoroalkoxyalkanes (PFA) and fluorinated ethylene propylene (FEP), and further also include aramides and siloxanes and mixtures thereof. Preferred polymeric fillers are fluoropolymers and siloxanes and mixtures thereof.

Appropriate fillers may furthermore have different morphology. In particular, they may be in particular fibrous or non-fibrous.

Fibrous fillers may be selected from glass fibers, carbon fibers, carbone nanotubes, aramide fibers and mixtures thereof. The polymeric material preferably comprises 1 to 30%, in particular 5 to 15% by weight of fibrous filler.

Non-fibrous fillers may be selected in the group consisting of graphite, fluoropolymers such as PTFE, PFA or FEP, carbon black, metal oxides, glass beads or flakes, siloxanes and mixtures thereof. The polymeric material preferably comprises 2 to 60%, in particular 5 to 30% by weight of non-fibrous filler.

According to a preferred embodiment, the polymeric material comprises both a fibrous and a non-fibrous filler. In particular, the polymeric material may comprise carbon based fillers such as carbon fibers, graphite and a mixture thereof, and a fluoropolymer such as PTFE. Most preferred is such a material comprising 5 to 15% by weight of carbon fibers, 5 to 15% by weight of graphite and 5 to 15% by weight of a fluoropolymer such as PTFE.

In order to further adapt the properties of the polymeric material to the specifications, it is possible to add suitable additives. The polymeric material may thus further comprise additives such as impact modifiers, plasticizers, pigments or dyes, thermal stabilizers, ultraviolet light stabilizers or absorbers, antioxidants, processing aids or lubricants or mixtures thereof. Preferred is a polymeric material comprising 0.1 to 15% by weight, in particular 0.1 to 10, especially 0.1 to 7.5% and most preferred 0.1 to 6% by weight of one or more additives.

According to a preferred embodiment, the polymeric material comprises 40 to 80%, in particular 50 to 70% and more specifically 55 to 65% by weight of at least one polyetherketoneketone (PEKK), 10 to 70%, preferably 20 to 60%, in particular 30 to 50 and more specifically 35 to 45% by weight of one or more fillers and 0.1 to 10%, in particular 0.1 to 7.5% and more specifically 0.1 to 6% by weight of one or more additives. Preferably, the percentages above add up to 100%, and the polymeric material does not comprise any additional ingredient.

As discussed above, the polymeric material may comprise other polymers, in particular polymeric fillers such as PTFE or polymeric additives such as impact modifiers.

The polymeric material can be produced by mixing the PEKK with the optional filler and/or additives using known processes, in particular by compounding. The polymeric material may then be granulated and eventually further transformed as required.

The wear and friction articles may be produced from the polymeric material by any of the techniques known by the skilled person to that end, for instance by molding, injection, extrusion, coating, sintering, thermoforming or machining.

Preferred wear and friction articles according to the invention are manufactured parts that upon use are in contact with other surfaces while being in motion. Particularly preferred such articles may be selected in the group consisting of bearings, bushings, valve seats, gears, pistons, piston rings, valve guides, compressor vanes, seals and components of engines.

Articles of the present invention may find applications including but not limited to the fields of airspace, aircraft, automotive, oil and gas, electronics, building and construction, ducting and high temperature containers.

If appropriate, the articles according to the invention may be only coated or made partly or entirely of the polymeric material comprising PEKK.

Due to the specific properties of PEKK, the articles according to the invention benefit from a wear behaviour which is low and remains controlled even at elevated temperature, including around the glass transition temperature. Accordingly, such articles show an extended service life and may be used in a large range of temperatures compared to other high performance polymers such as PEEK.

According to a second aspect, the invention concerns the use of the polymeric material described above for reducing wear at elevated temperature, in particular between 130° C. and the melting temperature, and more specifically between 130 and 180° C. In particular, the polymeric material described may be used for the manufacture of a wear and friction article as described above, and more specifically, a wear and friction article such as described above that is to be used at elevated temperature.

According to a preferred embodiment of the invention, the use of the polymeric material described further allows to reduce friction at elevated temperature.

EXAMPLES

Unless mentioned otherwise, the melt viscosity of the polymers was measured using a plate-plate Rheometer (model MTR 302 by Anton PAAR) under nitrogen at a frequency of 1 Hz at a temperature of 380° C.

Unless mentioned otherwise, percentages refer to a weight percentage with respect to the total weight of the formulation. Further, isomer ratios are, unless mentioned otherwise, molar ratios.

Unless mentioned otherwise, the glass transition temperature and melt temperature of the polymers were measured using differential scanning calorimetry (DSC) according to ISO 11357, with a heating rate of 20° C./min, the sample having been previously submitted to a first heating and cooling cycle at a speed of 20° C./min.

Example 1

Wear of Neat Resin

The wear behaviour of the following PEKK and PEEK polymers was studied as described below.

The PEKK polymer (sold under the name KEPSTAN PEKK 8003 by Arkema France) has a ratio T:I isomers of 80:20, a glass transition temperature of 165° C. and a melt viscosity of 340 Pa·s.

The PEEK polymer (sold under the name PEEK 450 G by Victrex) has a glass transition temperature of 150° C. and a melt viscosity of 2700 Pa·s.

Suitable specimen were produced for each polymer by injection of dumbbells in the following conditions: mass temperature: 390° C.; mold temperature 220° C., injection speed 50 cm³/s, and subsequent tempering: 2 h at 180° C. The specimen were then punched out of the central part of the dumbbells obtained.

The specific wear rate of the polymer specimen was determined between 85° C. and 175° C. according to ASTM G137 using the block-on-ring configuration (loading: 5 MPa; sliding speed (unidirectional, dry): 1 m/s; counter-body: 100Cr6). All experimental runs were made at least five times so as to check data repeatability.

The results obtained are summarized in Table 1 below.

It can be noted that for the PEEK polymer, the specific wear rate markedly increases when approaching the glass transition temperature (Tg=150° C.). More specifically, the wear rate for PEEK exceeds $30 \cdot 10^{-6}$ mm³/Nm at 130° C., that is, 20° C. below the glass transition temperature (Tg). Furthermore, the wear rate of PEEK becomes increasingly inhomogeneous when approaching the Tg. In particular, between 130° C. and 160° C., that is, in the range of Tg−20° C. to Tg+10° C., the standard deviation calculated is comparable to the wear rate value.

In contrast, the PEKK polymer shows a smooth, continuous evolution of the specific wear rate with temperature, including in the region around the glass transition (Tg=165° C.) until at least 10° C. above the glass transition temperature. More specifically, the wear rate for PEKK does not exceed $20 \cdot 10^{-6}$ mm³/Nm up to 175° C., that is, 10° C. above the Tg. Furthermore, the wear rate of PEKK stays stable and homogeneous even above the Tg and up to Tg+10° C. Taking into account the offset of the glass transition temperature, the domain of stable wear of polymer materials based on PEKK is thus extended by 40° C. at least compared to PEEK. In addition, the absolute values of the specific wear rate are lower for PEKK over substantially the whole temperature range.

TABLE 1

| | Specific wear rate neat resin | |
| --- | --- | --- |
| Temperature [° C.] | PEKK Specific wear rate $\omega_s$ [$10^{-6}$ mm³/Nm] | PEEK Specific wear rate $\omega_s$ [$10^{-6}$ mm³/Nm] |
| 85 | 6 ± 3 | 8 ± 3 |
| 100 | 8 ± 4 | 10 ± 6 |
| 115 | 8 ± 2 | 14 ± 11 |
| 130 | 12 ± 3 | 32 ± 25 |
| 145 | 13 ± 3 | 34 ± 31 |
| 160 | 16 ± 2 | 18 ± 23 |
| 175 | 18 ± 8 | 6 ± 12 |

Example 2

Friction of Neat Resin

The friction coefficient of the PEKK and PEEK polymers detailed in example 1 was measured between 85 and 175° C. according to ASTM G137 using the block-on-ring configuration (loading: 5 MPa; sliding speed (unidirectional, dry): 1 m/s; counterbody: 100Cr6).

The data is shown in Table 2. The results show that the friction coefficients of PEEK and PEKK polymers do not differ significantly. Accordingly, the difference in the wear behaviour appears to be unrelated to the friction coefficient.

TABLE 2

| | Friction coefficient neat resin | |
| --- | --- | --- |
| Temperature [° C.] | PEKK Friction coefficient | PEEK Friction coefficient |
| 85 | 0.46 | 0.47 |
| 100 | 0.47 | 0.49 |
| 115 | 0.46 | 0.51 |
| 130 | 0.45 | 0.5 |

TABLE 2-continued

Friction coefficient neat resin

| Temperature [° C.] | PEKK Friction coefficient | PEEK Friction coefficient |
|---|---|---|
| 145 | 0.45 | 0.48 |
| 160 | 0.44 | 0.4 |
| 175 | 0.4 | 0.3 |

Example 3

Wear of Reinforced PAEK Formulations

The specific wear rate of reinforced PEEK and of PEKK formulations was measured according to the procedure set out in example 1 above.

The composition of the tested PEKK formulation (PEKK F) and PEEK formulation (PEEK F) is summarized in Table 3 below. Table 4 indicates the glass transition temperature and melt viscosity of the PAEK matrix used in the formulations.

The specific wear rate measured for the tested formulations is summarized in Table 5 below.

It can be noted from the results that the specific wear rate is more stable for the reinforced PEEK formulation compared to PEEK alone. However, the wear rate of the reinforced PEEK varies notably more across the temperature range compared to the comparable reinforced PEKK. Further, the specific wear rate is also lower for the PEKK formulation compared to the comparable PEEK formulation.

TABLE 3

Composition of reinforced PAEK formulations

| Reference | T:I ratio | Carbon fibers (wt. %) | Graphite (wt. %) | PTFE (wt. %) | Mineral fillers (wt. %) |
|---|---|---|---|---|---|
| PEKK A (6003HF40) | 60:40 | 10 | 10 | — | 20 |
| PEKK B (8003HF40) | 80:20 | 10 | 10 | — | 20 |
| PEKK C (6003FC30) | 60:40 | 10 | 10 | 10 | — |
| PEKK D (8003FC30) | 80:20 | 10 | 10 | 10 | — |
| PEEK E (150HF40) | N.A. | 10 | 10 | — | 20 |
| PEEK F (450FC30) | N.A. | 10 | 10 | 10 | — |

TABLE 4

Characterization of PAEK polymers and formulations

| Reference | Glass transition temperature Tg [° C.] | Melt viscosity of PAEK matrix [Pa · s] |
|---|---|---|
| Kepstan PEKK 8003 | 165 | 340 |
| Victrex PEEK 450 G | 150 | 2700 |
| PEKK A (6003HF40) | 160 | 340 |
| PEKK B (8003HF40) | 165 | 340 |
| PEKK C (6003FC30) | 160 | 340 |
| PEKK D (8003FC30) | 165 | 340 |
| PEEK E (150HF40) | 150 | 400 |
| PEEK F (450FC30) | 150 | 2700 |

TABLE 5

Specific wear rate of reinforced PAEK formulations

| Temperature [° C.] | PEKK D Specific wear rate $\omega_s$ [$10^{-6}$ mm³/Nm] | PEEK F Specific wear rate $\omega_s$ [$10^{-6}$ mm³/Nm] |
|---|---|---|
| 85 | 0.6 | 0.7 |
| 100 | 0.66 | 1.05 |
| 115 | 0.75 | 1.2 |
| 130 | 0.9 | 1.4 |
| 145 | 1.1 | 1.4 |
| 160 | 1.6 | 1.8 |
| 175 | 1.8 | 2.1 |

Example 4

Friction of Reinforced PAEK Formulations

The friction coefficient of the reinforced PEKK and PEEK formulations detailed in example 3 was measured between 85 and 175° C. according to ASTM G137 using the block-on-ring configuration (loading: 5 MPa; sliding speed (unidirectional, dry): 1 m/s; counterbody: 100Cr6).

The data obtained is shown in Table 6 below. The friction coefficients of the PEEK and PEKK formulations evaluated do not follow the trend observed in the wear behaviour.

TABLE 6

Friction coefficient reinforced PAEK

| Temperature [° C.] | PEKK D Friction coefficient | PEEK F Friction coefficient |
|---|---|---|
| 85 | 0.28 | 0.4 |
| 100 | 0.22 | 0.39 |
| 115 | 0.24 | 0.37 |
| 130 | 0.3 | 0.37 |
| 145 | 0.36 | 0.32 |
| 160 | 0.44 | 0.33 |
| 175 | 0.48 | 0.36 |

Example 5

Wear of Reinforced PAEK Formulations at Room Temperature

The wear of the PEKK and PEEK polymer formulations with fibrous and non-fibrous fillers was studied at room temperature on a ball-on-prism tribometer (according to ISO 7148-2, rotation type movement, pressure $F_N$=21.2 N and speed v=28.2 mm/s) as a function of the sliding distance against stainless steel as the absolute wear volume in mm³.

The composition of the PEKK and PEEK formulations with filler studied are summarized in Table 3 above. Table 4 indicates the glass transition temperatures and melt viscosities of the PAEK matrix used in the formulations.

The test specimens were obtained as explained above by punching out the central part of dumbbells prepared by injection of the respective PAEK formulations.

The wear volume of the specimens was determined as a function of the sliding distance of a stainless steel ball (100Cr6). All experimental runs were made at least five times so as to check data repeatability.

The wear volume measured as a function of the sliding distance is shown in FIG. 1 for the formulations A to F the composition of which is detailed in table 4 above. The major feature apparent from the graphs is the difference between PEEK and PEKK formulations. Indeed, the wear volume for the PEEK formulations studied is markedly higher than for comparable PEKK formulations. As a secondary feature, it can be noted that the PTFE filled formulations show a notably lower wear volume compared to similar formulations not charged with PTFE. With regard to the PEKK formulations, it is further to be noted that there is little influence of the T:I ratio on the wear behaviour.

As demonstrated by the above examples, PEKK polymers have unexpected advantages with regard to wear behaviour at elevated temperature compared to other polyaryletherketones such as PEEK. In particular, the wear is more stable with regard to temperature and overall lower for PEKK polymers compared to PEEK. Such differences are also observed at room temperature in polymeric materials further comprising fillers and optional additives. In particular, PEKK formulations with carbon fibers and graphite suffer significantly less wear by a stainless steel ball than comparable formulations with PEEK.

Therefore, PEKK is a material of choice for producing structures such as wear and friction articles, notably if they are likely to be subjected to high loads, high speeds, and/or elevated temperatures. Such articles are expected to have a longer service life and/or to resist to higher use temperatures.

The invention claimed is:

1. A method of reducing wear, the method comprising operating a polymeric material comprising:
    20 to 100% by weight of at least one polyetherketoneketone (PEKK);
    0 to 80% by weight of one or more fillers; and
    0 to 20% by weight of one or more additives,
    at a temperature between 130° C. and 180° C.

2. The method according to claim 1, wherein the polyetherketoneketone has a T:I isomer ratio of from 55:45 to 100:0.

3. The method according to claim 1, wherein the polymeric material comprises 10 to 70% by weight of one or more fillers.

4. The method according to claim 3, wherein the polymeric material comprises 20 to 60% by weight of one or more fillers.

5. The method according to claim 1, wherein the polyetherketoneketone comprises repeating units represented by the following formulas I and II:

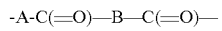     I

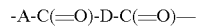     II where A is a p,p' Ph-O-Ph group, Ph is a phenylene radical, B is p-phenylene, and D is phenylene and has a Formula I:Formula II isomer ratio, called T:I isomer ratio, of from 55:45 to 100:0.

6. The method according to claim 1, wherein the filler comprises a fibrous filler.

7. The method according to claim 6, wherein the fibrous filler is selected from glass fibers, carbon fibers, carbon nanotubes, aramide fibers and mixtures thereof.

8. The method according to claim 1, wherein the filler comprises a non-fibrous filler.

9. The method according to claim 8, wherein the non-fibrous filler is selected from the group consisting of mineral fillers, metal oxides, talc, calcium carbonate, and polymeric fillers.

10. The method according to claim 8, wherein the non-fibrous filler is selected in the group consisting of graphite, fluoropolymers, carbon black, glass beads or flakes, siloxanes and mixtures thereof.

11. The method according to claim 1, wherein the polymeric material is a wear and friction article selected from the group consisting of bearings, bushings, valve seats, gears, pistons, piston rings, valve guides, compressor vanes, seals, and components of engines.

12. The method according to claim 1, wherein a specific wear rate of the polymeric material, as measured according to ASTM G137 using the block-on-ring configuration (loading: 5 MPa; sliding speed (unidirectional, dry): 1 m/s; counterbody: 100Cr6), does not exceed $30 \times 10^{-6}$ mm$^3$/Nm at temperatures up to 10° C. above a glass transition temperature (Tg) of the polymeric material.

13. The method according to claim 12, wherein the specific wear rate is less than $20 \times 10^{-6}$ mm$^3$/Nm.

14. The method according to claim 12, wherein a friction coefficient of the neat polyetherketoneketone, as measured according to ASTM G137, does not exceed 0.45 at a temperature of 175° C.

15. The method according to claim 1, wherein the polyetherketoneketone has a T:I isomer ratio of from 50:50 to 100:0.

* * * * *